UNITED STATES PATENT OFFICE.

EMIL FISCHER, OF BERLIN, GERMANY, ASSIGNOR TO C. F. BOEHRINGER & SOEHNE, OF WALDHOF, GERMANY.

PROCESS OF MAKING ALKYL DERIVATIVES OF URIC ACID.

SPECIFICATION forming part of Letters Patent No. 621,805, dated March 28, 1899.

Original application filed October 26, 1896, Serial No. 610,126. Divided and this application filed December 3, 1898. Serial No. 698,139. (No specimens.)

*To all whom it may concern:*

Be it known that I, EMIL FISCHER, a citizen of the Empire of Germany, residing at Berlin, in the Empire of Germany, have invented a certain new and useful Improvement in the Art of Preparing the Alkyl Derivatives of Uric Acid; and I do hereby declare the following to be a full, clear, and exact description of the invention, such as will enable others skilled in the art to which it appertains to make and use the same.

The present invention relates to the art of obtaining the substitution products of uric acids, and more particularly to the production of alkyl-uric acids.

In my Patent No. 616,700, dated December 27, 1898, of which this is a divisional application, I have described a process which, broadly considered, consists in treating a uric acid with a haloid ether, such as iodid of methyl or ethyl or chlorid of benzyl, together with an alkali, preferably in the wet way. In that patent the present invention is described in exemplification of carrying out the process therein broadly claimed.

The present application is designed to cover this invention specifically, the said invention consisting, essentially, in treating a uric acid with an alkali and a haloid ether under such conditions that the alkali and the haloid ether are each added in the proportions of two molecules to one molecule of the uric acid.

More specifically, the invention consists in adding an alkali and a haloid ether in the said proportions to uric acid proper, whereby alpha-monomethyl-uric acid is obtained.

The term "alkali" as employed in this specification and the claims covers a wide range of substances having alkaline properties, as will be shown hereinafter. Moreover, the haloid-ether may be an alkyl-iodid, such as methyl-iodid or an alkyl-bromid or an alkyl-chlorid. When employing the wet way, it is not indispensably necessary to completely dissolve the uric acid, which is particularly difficult in the case of uric acid proper, but it will be sufficient if such uric acid be suspended in the liquid.

One branch of my present invention accordingly consists in suspending the uric acid in the liquid when acting thereon with the alkali and haloid-ether.

My invention, moreover, consists in such further features, steps, and processes as will be hereinafter set forth, and pointed out in the claims.

In illustration of my invention I will now describe several examples, showing how the same may be carried into effect.

*1. Conversion of uric acid into alpha-mono-methyl-uric acid.*—Twenty parts of uric acid are dissolved in thirteen hundred parts of water and two hundred and forty parts normal potash-lye (KHO.Aq) and mixed with thirty-eight parts of methyl-iodid. The mixture is maintained at a temperature of 100° centigrade in a digester for the space of two hours, the liquid being continually agitated. The following equations express the reaction taking place:

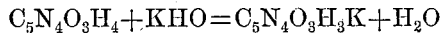
$$C_5N_4O_3H_4 + KHO = C_5N_4O_3H_3K + H_2O$$

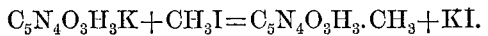
$$C_5N_4O_3H_3K + CH_3I = C_5N_4O_3H_3 \cdot CH_3 + KI.$$

From this solution, to which a little hydrochloric acid is added, the alpha-mono-methyl-uric acid (which is identical with the acid discovered by Hill and Mabery and which is probably the 1-mono-methyl-derivative) is precipitated as a crystalline powder after the solution has been cooled or allowed to cool. The reaction is not in exact accord with the theory in so far as the amounts of alkali and methyl-iodid correspond to two molecules, and hence would be sufficient for the formation of dimethyl-compounds. Experience, however, has shown that when employing less alkali or less of the methyl-halogen compound a portion of the uric acid remains unchanged and will remain mixed with the monomethyl-derivative. The same proportionate addition of the alkali and the haloid-ether to dimethyl-uric acid will lead to the tetra-methyl-uric acid.

*2. Conversion of alpha-dimethyl-uric acid into tetra-methyl-uric acid.*—Three parts (one molecule) of alpha-dimethyl-uric acid (which probably is the 1.4-dimethyl-derivative) containing water of crystallization, which may readily be obtained from neutral urate of lead either by means of methyl-iodid, according to the directions given by Hill and Mabery, or, as I have found, by means of methyl-bromid or methyl-chlorid, are dissolved in 28.2 parts of normal potash-lye, (KOH.Aq,) and after having added five parts of methyl-iodid (corresponding to two molecules) the mixture is maintained at about 100° centigrade for one hour in the manner described, the mixture being agitated or shaken. The yield of tetramethyl-uric acid is very plentiful. The reaction takes place according to the following equations:

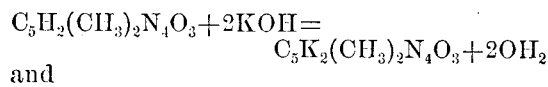

and

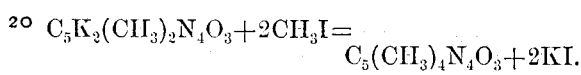

To obtain this reaction it is not absolutely necessary to raise the temperature. It will take place also at the ordinary temperature, but in this case very much more slowly than when the temperature is raised, as indicated, so that it is necessary to shake or agitate for forty-eight hours instead of only for one hour. The yield of tetra-methyl-uric acid, moreover, is not so good as in the first method if the above-given quantities of alpha-dimethyl-uric acid, potash-lye, and methyl-iodid are employed.

If in the above processes, in lieu of the methyl-iodid, I employ a corresponding quantity of methyl-bromid, the reaction will occur in the same manner. Methyl-chlorid may also be employed for the same purpose in the place of the iodid.

In alkylizing uric acid in the wet way by acting upon the same with alkali and a haloid ether it is not necessary to completely dissolve the same. It is only necessary to suspend the same in a quantity of water insufficient for complete solution, preferably agitating this mixture and adding the alkali and the haloid ether, or I may suspend a solid urate, such as potassium-urate, in an insufficient quantity of water and act upon the same, as before described, with a haloid-ether.

If, for example, five parts of the difficultly-soluble acid urate of potassium are mixed with seventy-five parts water and four parts methyl-iodid and heated to 100° centigrade and maintained at this temperature for from three to four hours while continually shaking, a complete decomposition takes place, the resulting product being alpha-monomethyl-uric acid mixed with a very small quantity of regenerated uric acid.

The term "alkali" as used in this specification and in the claims embraces not only the caustic alkalies—such as potassium-hydrate (KHO) or sodium-hydrate (NaHO) or potash-lye and soda-lye, &c.—but also the salts of the alkali-metals (including ammonium) with the weaker inorganic acids—such as carbonic, boric, phosphoric acids—or organic acids, such as acetic acid. These salts having preponderating alkaline properties will also answer when the difficultly-soluble uric acid is merely suspended and not completely dissolved in the liquid.

For example, in preparing alpha-monomethyl-uric acid I mix fifteen parts of uric acid with nineteen parts methyl-iodid, three hundred parts water, and 9.2 parts potassium-carbonate, and heat the mixture to from 100° to 110° centigrade, maintaining it at this temperature for four hours while constantly shaking. The yield is almost equal to the theoretical yield. If in this process in the place of the carbonate of potassium I employ twenty-six parts of borax or seventeen parts of tri-phosphate of sodium or thirteen parts of potassium-acetate, the other conditions remaining the same, the reaction will proceed in the same way. The yield, however, is less and the monomethyl-uric acid is mixed with variable amounts of unchanged uric acid.

What I claim, and desire to secure by Letters Patent of the United States, is—

1. In the art of preparing the alkyl-derivatives of uric acid, the process which consists in reacting on a uric acid with an alkali and a haloid ether in the proportions of two molecules each of the alkali and the haloid-ether to one molecule of the uric acid.

2. In the art of preparing the alkyl derivatives of uric acid, the process which consists in adding a uric acid to an alkali solution and then adding a haloid-ether the alkali and the haloid-ether added being each in the proportion of two molecules to one molecule of the uric acid, the mixture being heated and agitated.

3. In the art of preparing the alkyl-derivatives of uric acid, the process which consists in suspending a uric acid in water and alkali and adding to the mixture a haloid ether.

4. In the art of preparing the alkyl-derivatives of uric acid, the process which consists in adding to a urate suspended in water a haloid-ether.

5. The process which consists in suspending a uric acid in water and alkali and adding thereto a haloid-ether and heating and agitating the mixture.

6. The process which consists in adding to uric acid-proper an alkali and a haloid ether in the proportion of two molecules of each of the latter to one molecule of the uric acid.

7. The process which consists in adding uric acid-proper to an alkali solution and a haloid-ether in the proportion of two molecules of each of the latter to one molecule of the uric acid.

8. The process which consists in reacting on uric acid-proper with an alkali solution and a haloid-ether in the proportion of two molecules of each of the latter to one molecule of the uric acid and heating and agitating the mixture.

9. The process which consists in suspending uric acid-proper in water and then reacting thereon with an alkali and a haloid-ether and heating and agitating the mixture.

10. The process which consists in adding uric acid-proper to potash-lye and adding thereto methyl-iodid and heating and agitating the mixture.

11. The process which consists in adding uric acid-proper to potash-lye and adding thereto methyl-iodid and heating and agitating the mixture and then precipitating the resultant alpha-monomethyl-uric acid by acid.

In testimony whereof I affix my signature in presence of two witnesses.

EMIL FISCHER.

Witnesses:
HENRY HASPER,
ERWIN L. GOLDSCHMIDT.